United States Patent
Chen et al.

(10) Patent No.: US 9,637,198 B2
(45) Date of Patent: May 2, 2017

(54) POWER ASSISTING DEVICE AND BICYCLE USING SAME

(71) Applicant: HON HAI PRECISION INDUSTRY CO., LTD., New Taipei (TW)

(72) Inventors: Yen-Chi Chen, New Taipei (TW);
Chang-Yuan Shih, New Taipei (TW);
Shih-Hsin Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/826,219

(22) Filed: Aug. 14, 2015

(65) Prior Publication Data

US 2016/0288873 A1    Oct. 6, 2016

(30) Foreign Application Priority Data

Mar. 31, 2015  (TW) .............................. 104110580 A

(51) Int. Cl.
| | | |
|---|---|---|
| *B62M 13/00* | (2010.01) | |
| *B62M 6/35* | (2010.01) | |
| *B62M 6/75* | (2010.01) | |
| *B62M 6/80* | (2010.01) | |
| *B62M 11/10* | (2006.01) | |
| *B62M 13/04* | (2006.01) | |

(52) U.S. Cl.
CPC ................ *B62M 6/75* (2013.01); *B62M 6/35* (2013.01); *B62M 6/80* (2013.01); *B62M 11/10* (2013.01); *B62M 13/00* (2013.01); *B62M 13/04* (2013.01)

(58) Field of Classification Search
CPC .......... B62M 6/35; B62M 6/75; B62M 13/00; B62M 13/04
USPC ............................................ 180/211, 221, 222
See application file for complete search history.

(56) References Cited

U.S. PATENT DOCUMENTS

| | | | | |
|---|---|---|---|---|
| 599,048 | A  * | 2/1898 | Turner ..................... | B62M 1/10 |
| | | | | 188/24.11 |
| 1,442,556 | A  * | 1/1923 | Bharucha ............... | B62M 23/02 |
| | | | | 180/7.4 |
| 3,339,659 | A  * | 9/1967 | Wolf ........................ | B62M 7/00 |
| | | | | 180/205.7 |

(Continued)

FOREIGN PATENT DOCUMENTS

| | | | | |
|---|---|---|---|---|
| DE | 3532993 A1 * | 3/1986 | ............... | B62M 6/75 |
| DE | 4219763 A1 * | 12/1993 | ................ | B62J 6/08 |

(Continued)

*Primary Examiner* — Joseph Rocca
*Assistant Examiner* — Daniel Yeagley
(74) *Attorney, Agent, or Firm* — Steven Reiss

(57) ABSTRACT

The power assisting device includes driver with a rotary axis, a main gear, a first transmission rod, a first bevel gear, a second bevel gear, a first rotating rod, a third bevel gear, and a first driving wheel. The main gear is driven by the driver to rotate about the rotary axis. The first transmission rod extends along a direction perpendicular to the rotary axis. The first bevel gear and the second bevel gear are separately sleeved on the transmission rod. The first bevel gear is engaged with the main gear. The first rotating rod extends along a direction parallel to the rotary axis. The third bevel gear is sleeved on the first rotating rod and is engaged with the second bevel gear. The first driving wheel is coupled to the first rotating rod for assisting a wheel of a vehicle to move forward.

17 Claims, 2 Drawing Sheets

(56) References Cited

U.S. PATENT DOCUMENTS

| | | | | |
|---|---|---|---|---|
| 3,891,044 | A * | 6/1975 | Tiede | B62M 6/75 180/222 |
| 4,029,332 | A * | 6/1977 | Davis | B62L 1/04 280/234 |
| 5,816,355 | A * | 10/1998 | Battlogg | B62M 6/75 180/206.8 |
| 6,446,985 | B1 * | 9/2002 | Tompsett | B62M 23/00 280/259 |
| 6,827,362 | B2 * | 12/2004 | Smith | B62M 23/00 280/230 |
| 8,056,693 | B2 * | 11/2011 | Christini | B62M 23/00 180/224 |

FOREIGN PATENT DOCUMENTS

| | | | | |
|---|---|---|---|---|
| DE | 102010060808 A1 * | 6/2011 | | B62M 6/75 |
| EP | 0145431 A2 * | 6/1985 | | B62M 13/04 |
| IL | WO 9421509 A1 * | 9/1994 | | A61G 5/045 |
| KR | 101048550 B1 * | 7/2011 | | |

\* cited by examiner

POWER ASSISTING DEVICE AND BICYCLE USING SAME

FIELD

The subject matter herein generally relates to a power assisting device for a bicycle, and a bicycle using the power assisting device.

BACKGROUND

Bicycles are configured to be propelled by the rider. In some situations, the rider may not be able to propel the bicycle. In those situations, the rider can attach an electronic motor and battery to supply the motive force.

BRIEF DESCRIPTION OF THE DRAWINGS

Implementations of the present technology will now be described, by way of example only, with reference to the attached figures.

DETAILED DESCRIPTION

Figure 1:
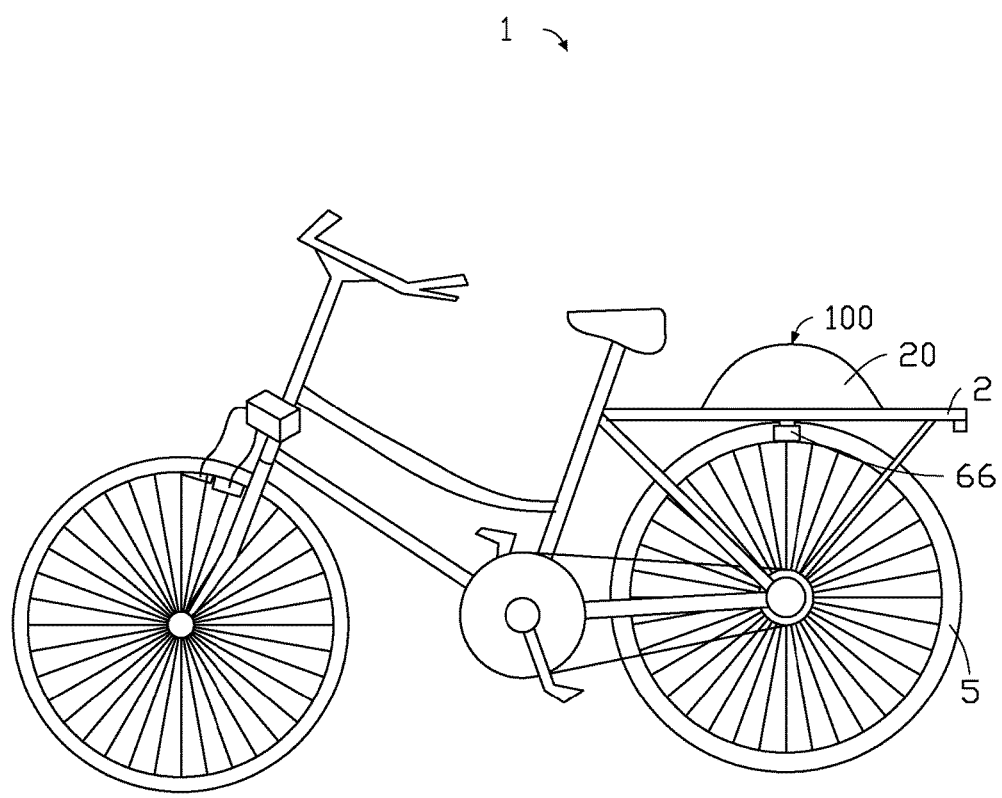
FIG. 1 is a diagrammatic view of an embodiment of a bicycle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a power assisting device. The power assisting device can include a driver, a main gear, a first transmission rod, a first bevel gear, a second bevel gear, a first rotating rod, a third bevel gear, and a first driving wheel. The driver can have a rotary axis. The main gear can be driven by the driver to be rotate about the rotary axis of the driver. The first transmission rod can extend along a direction perpendicular to the rotary axis. The first bevel gear can be sleeved on the transmission rod and be engaged with the main gear. The second bevel gear can be sleeved on the transmission rod and be spaced from the first bevel gear. The first rotating rod can be positioned below the first transmission rod and extend along a direction parallel to the rotary axis. The third bevel gear can be sleeved on the first rotating rod and be engaged with the second bevel gear. The first driving wheel can be coupled to the first rotating rod and be spaced from the third bevel gear. The first driving wheel is configured to assist in rotation of a wheel of a vehicle.

The present disclosure is further described in relation to a bicycle. The bicycle can include a frame, a wheel and a power assisting device. Both the wheel and the power assisting device can be mounted on the frame. The power assisting device can include a driver, a main gear, a first transmission rod, a first bevel gear, a second bevel gear, a first rotating rod, a third bevel gear, and a first driving wheel. The driver can define a rotary axis and can rotate the main gear about the rotary axis. The first transmission rod can extend along a direction perpendicular to the rotary axis. The first bevel gear can be sleeved on the transmission rod and be engaged with the main gear. The second bevel gear can be sleeved on the transmission rod and be spaced from the first bevel gear. The first rotating rod can be positioned below the first transmission rod and extend along a direction parallel to the rotary axis. The third bevel gear can be sleeved on the first rotating rod and be engaged with the second bevel gear. The first driving wheel can be coupled to the first rotating rod and be spaced from the third bevel gear. The first driving wheel can be abutted against a first side surface of the wheel for assisting the wheel 5 to move forward.

Figure 2:
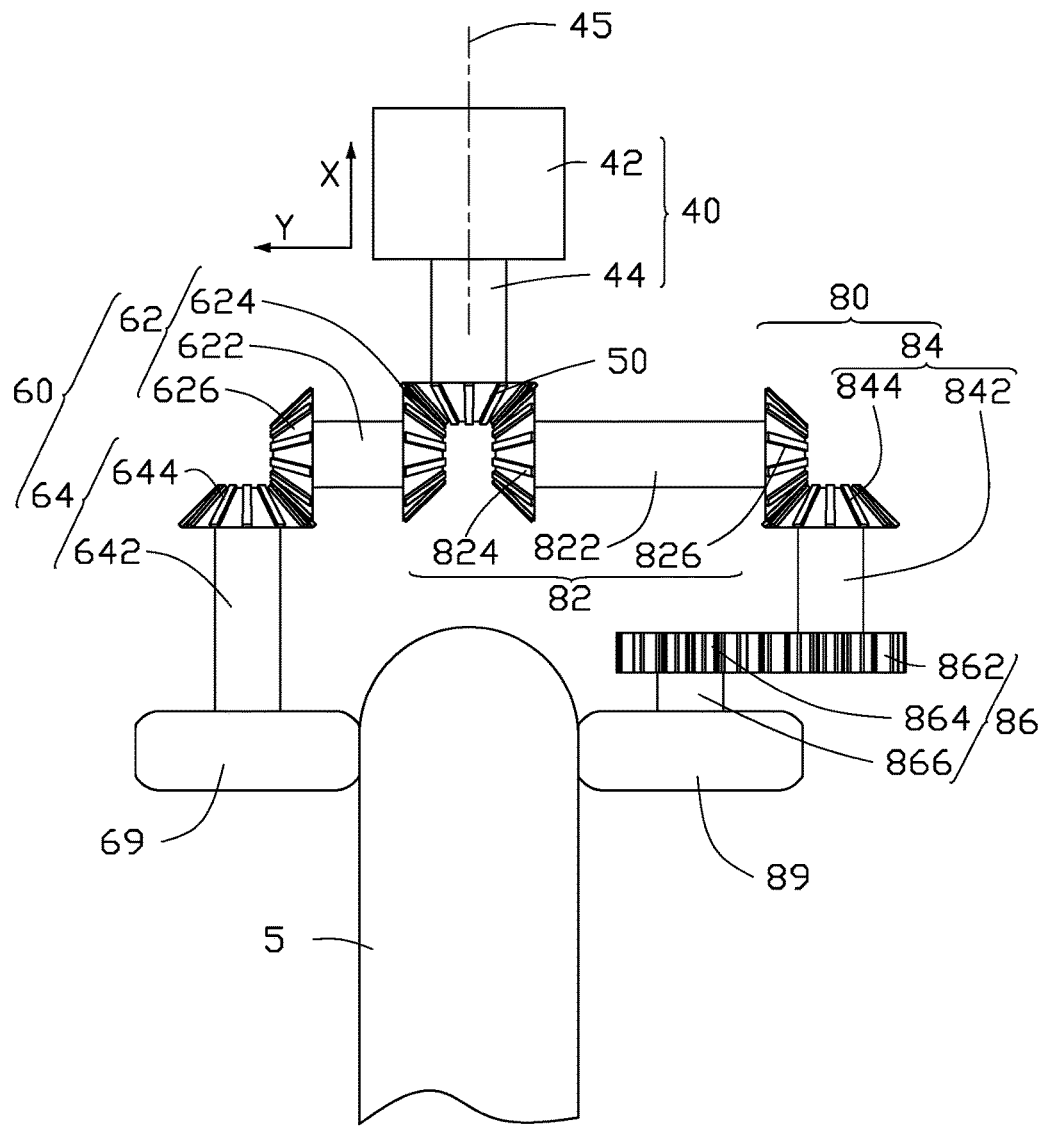
FIG. 2 is a diagrammatic view of a power assisting device without housing, and part of a rear wheel in FIG. 1.

FIG. 1 illustrates a bicycle 1 which can include a frame 2, a rear wheel 5, and a power assisting device 100. Both the rear wheel 5 and the power assisting device 100 can be mounted on the frame 2. FIG. 2 illustrates that the rear wheel 5 can include a first side surface 51 and a second side surface 52 opposite to the first side surface 51. In the illustrated embodiment, the power assisting device 100 can be positioned adjacent to the rear wheel 5. Other components and configurations of the bicycle 1, such as, a front wheel, a pedal, a crank, are not described here.

Also referring to FIGS. 1 and 2, the power assisting device 100 can include a housing 20, a driver 40, a main gear 50, a first transferring assembly 60, a second transferring assembly 80, a first driving wheel 66, and a second driving wheel 88. The housing 20 can be coupled to the frame 2 adjacent to the rear wheel 5. The rear wheel 5 can include two opposite sides 51, 52. The driver 40, main gear 50, first transferring assembly 60 and the second transferring assembly 80 can be mounted in the housing 20. The main gear 50 can be driven by the driver 40. The first transferring assembly 60 and the second transferring assembly 80 can be engaged with the main gear 50 and positioned at two opposite sides 51, 52 of the rear wheel 5. The first driving wheel 66 can be coupled to the first transferring assembly 60 and be in frictional contact with the first side surface 51 of the rear wheel 5. The second driving wheel 88 can be coupled to the second transferring assembly 80 and be in frictional contact with the second side surface 52 of the rear wheel 5.

The driver 40 can include a driving body 42 and a driving shaft 44 rotatably coupled to the driving body 42. The main gear 50 can be coupled to the driving shaft 44. The driving shaft 44 can have a rotary axis 45 extending along a lengthwise direction. The driving body 42 is capable of driving the main gear 50 to rotate about the rotary axis 45 (hereinafter called a first direction X).

The first transferring assembly 60 can include a first gear member 62, and a second gear member 64 engaged with the first gear member 62. The first gear member 62 can include a first transmission rod 622, a first bevel gear 624, and a second bevel gear 626. The first bevel gear 624 and the second bevel gear 626 can be separately sleeved on the first transmission rod 622 and fixed to the first transmission rod 622. The first transmission rod 622 can extend along a second direction Y that is perpendicular to the first direction X. In the illustrated embodiment, the first bevel gear 624 can be mounted on an end portion of the first transmission rod 622 and be engaged with the main gear 50. The second bevel gear 626 can be mounted on an end of the first transmission rod 622 away from the first bevel gear 624.

The second gear member 64 can include a first rotating rod 642 and a third bevel gear 644 sleeved on the first rotating rod 642. The first rotating rod 642 can extend along the first direction X. In the illustrated embodiment, the third bevel gear 644 can be mounted on an end of the first rotating rod 642 and be engaged with the second bevel gear 626.

The second transferring assembly 80 can include a third gear member 82, a fourth gear member 84 and a direction-changing gear 86 engaged in sequence. The third gear member 82 can include a second transmission rod 822, a fourth bevel gear 824 and a fifth bevel gear 826. The second transmission rod 822 and the first transmission rod 622 can be positioned at two sides of the main gear 50, and the second transmission rod 822 can extend along the second direction Y. The fourth bevel gear 824 and the fifth bevel gear 826 can be separately sleeved on the second transmission rod 822 and be fixed to the second transmission rod 822. In the illustrated embodiment, the fourth bevel gear 824 and the fifth bevel gear 826 can be respectively mounted on two ends of the second transmission rod 822. The fourth bevel gear 824 can be engaged with the main gear 50 and be positioned away from the first bevel gear 624. The fourth gear member 84 can include a second rotating rod 842 and a sixth bevel gear 844 sleeved on the second rotating rod 842. The second rotating rod 842 can extend along the first direction X. In the illustrated embodiment, the sixth bevel gear 844 can be mounted on an end of the second rotating rod 842 and be engaged with the fifth bevel gear 826. The direction-changing gear 86 is configured such that the second driving wheel 88 and the first driving wheel 66 can be rotated in the same direction. In the illustrated embodiment, the direction-changing gear 86 can include a first engaging portion 862, a second engaging portion 864 and a coupling rod 866. A central axial of the first engaging portion 862 can be parallel to that of the second engaging portion 864. In the illustrated embodiment, the first engaging portion 862 can be sleeved on an end of the second rotating rod 842 away from the sixth bevel gear 844. The second engaging portion 864 can be engaged with the first engaging portion 862 and be positioned adjacent to the rear wheel 5. The coupling rod 866 can be inserted into the second engaging portion 864 and extend along the first direction X.

The first driving wheel 66 can be coupled to the first rotating rod 642 and spaced from the third bevel gear 644. The second driving wheel 88 can be sleeved on the coupling rod 866 and be positioned spaced from the second engaging portion 864. The first driving wheel 66 and the second driving wheel 88 can be abutted against two opposite sides 51, 52 of the rear wheel 5. In the illustrated embodiment, the first driving wheel 66 and the second driving wheel 88 can be rubber wheels.

The driver 40 is capable of providing motive power. The first driving wheel 66 can be rotated by the motive power transmitted from the driver 40 via the first transferring assembly 60. The second driving wheel 88 can be rotated by the motive power transmitted from the driver 40 via the second transferring assembly 80. The first driving wheel 66 and the second driving wheel 88 are capable of being rotated to drive the rear wheel 5 and the bicycle 1 forward.

In other embodiments, the power assisting device 100 can be mounted on a front wheel of the bicycle 1. When the driver 40, main gear 50, first transferring assembly 60, second transferring assembly 80, first driving wheel 66 and the second driving wheel 88 are mounted on the frame 2 of the bicycle 1, the housing 20 can be omitted. When the first driving wheel 66 is capable of driving the rear wheel 5 to rotate, the second driving wheel 88 and the second transferring assembly 80 can be omitted.

In other embodiments, the power assisting device 100 can be applied to any type of vehicle that is manually powered but which can benefit from power assisting.

The embodiments shown and described above are only examples. Many details are often found in the art such as the other features of a power assisting device and a bicycle using the power assisting device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A power assisting device comprising:
   a driver having a rotary axis;
   a main gear driven by the driver to rotate about the rotary axis of the driver;
   a first transmission rod extending along a direction perpendicular to the rotary axis;
   a first bevel gear coupled to the first transmission rod and engaged with the main gear;
   a second bevel gear coupled to the first transmission rod and spaced apart from the first bevel gear;
   a first rotating rod positioned below the first transmission rod, and extending in a direction parallel to the rotary axis;
   a third bevel gear coupled to one end of the first rotating rod away from a wheel of a vehicle and engaged with the second bevel gear; and
   a first driving wheel coupled to another end of the first rotating rod adjacent to the wheel of the vehicle and spaced apart from the third bevel gear, wherein the first driving wheel abuts against a side surface of the wheel of the vehicle to assist in rotation of the wheel of the vehicle; and
   wherein the driver comprises a driving body and a driving shaft rotatably coupled to the driving body, the driving body is coupled to one end of the driving shaft away from the wheel of the vehicle, and the main gear is coupled to another end of the driving shaft adjacent to the wheel of the vehicle.

2. The power assisting device of claim 1, wherein the power assisting device further comprises:
   a second transmission rod extending along the direction perpendicular to the rotary axis, the second transmission rod and the first transmission rod positioned at two sides of the main gear;

a fourth bevel gear coupled to the second transmission rod, and engaged with the main gear;

a fifth bevel gear coupled to the second transmission rod and spaced apart from the fourth bevel gear;

a second rotating rod positioned below the second transmission rod, extending along the direction parallel to the rotary axis, a sixth bevel gear engaged with the fifth bevel gear, a direction-changing gear coupled to the second rotating rod, and a second driving wheel coupled to the direction-changing gear for assisting the wheel of the vehicle to move forward.

3. The power assisting device of claim 2, wherein the direction-changing gear comprises a first engaging portion, a second engaging portion and a coupling rod, the first engaging portion couples to the second rotating rod and spaced apart from the sixth bevel gear, the second engaging portion engages the first engaging portion, the coupling rod is inserted into the second engaging portion and extends along the direction parallel to the rotary axis, the second driving wheel couples to the coupling rod, wherein the second driving wheel is spaced apart from the second engaging portion to drive the wheel of the vehicle to move forward.

4. The power assisting device of claim 2, wherein the second driving wheel is a rubber wheel.

5. The power assisting device of claim 1, wherein the rotary axis extends along a lengthwise direction of the driving shaft, and wherein the driving body is capable of driving the main gear to rotate about the rotary axis.

6. The power assisting device of claim 1, wherein the first driving wheel is a rubber wheel.

7. A bicycle comprising:
a frame;
a wheel mounted on the frame; and
a power assisting device mounted on the frame and comprising:
    a driver having a rotary axis;
    a main gear driven by the driver to rotate about the rotary axis of the driver;
    a first transmission rod extending along a direction perpendicular to the rotary axis;
    a first bevel gear coupled to the first transmission rod and engaged with the main gear;
    a second bevel gear coupled to the first transmission rod and spaced apart from the first bevel gear;
    a first rotating rod positioned below the first transmission rod, extending along a direction parallel to the rotary axis;
    a third bevel gear coupled to one end of the first rotating rod away from the wheel of the bicycle and engaged with the second bevel gear; and
    a first driving wheel coupled to another end of the first rotating rod adjacent to the wheel of the bicycle and spaced apart from the third bevel gear, and the first driving wheel abuts against a first side surface of the wheel of the bicycle for assisting the wheel of the bicycle to move forward; and
    wherein the driver comprises a driving body and a driving shaft rotatably coupled to the driving body, the driving body is coupled to one end of the driving shaft away from the wheel of the bicycle, and the main gear is coupled to another end of the driving shaft adjacent to the wheel of the bicycle.

8. The bicycle of claim 7, wherein the power assisting device further comprising:

a second transmission rod extending along the direction perpendicular to the rotary axis, the second transmission rod and the first transmission rod positioned at two sides of the main gear;

a fourth bevel gear coupled to the second transmission rod, and engaged with the main gear;

a fifth bevel gear coupled to the second transmission rod and spaced apart from the fourth bevel gear;

a second rotating rod positioned below the second transmission rod, extending along the direction parallel to the rotary axis, a sixth bevel gear engaged with the fifth bevel gear, a direction-changing gear coupled to the second rotating rod, and a second driving wheel coupled to the direction-changing gear and abutted against a second side surface of the wheel of the bicycle opposite to the first side surface for assisting the wheel of the bicycle to move forward.

9. The bicycle of claim 8, wherein the direction-changing gear comprises a first engaging portion, a second engaging portion and a coupling rod, the first engaging portion couples to the second rotating rod and is positioned spaced apart from the sixth bevel gear, the second engaging portion engages the first engaging portion, the coupling rod is inserted into the second engaging portion and extends along the direction parallel to the rotary axis, the second driving wheel couples to the coupling rod and spaced apart from the second engaging portion to drive the wheel of the bicycle to move forward.

10. The bicycle of claim 8, wherein the second driving wheel is a rubber wheel.

11. The bicycle of claim 7, wherein the rotary axis extends along a lengthwise direction of the driving shaft, and wherein the driving body is capable of driving the main gear to rotate about the rotary axis.

12. The bicycle of claim 7, wherein the first driving wheel is a rubber wheel.

13. A bicycle comprising:
a frame;
a wheel mounted on the frame; and
a power assisting device mounted on the frame and comprising:
    a driver having a rotary axis;
    a main gear driven by the driver to rotate about the rotary axis of the driver;
    a first driving assembly, the first driving assembly comprising:
        a first transmission rod extending along a direction perpendicular to the rotary axis;
        a first bevel gear coupled to the first transmission rod and engaged with the main gear;
        a second bevel gear coupled to the first transmission rod and spaced apart from the first bevel gear;
        a first rotating rod positioned below the first transmission rod, extending along a direction parallel to the rotary axis;
        a third bevel gear coupled to the first rotating rod and engaged with the second bevel gear; and
        a first driving wheel coupled to the first rotating rod and spaced apart from the third bevel gear, and the first driving wheel abuts against a first side surface of the wheel of the bicycle for assisting the wheel of the bicycle to move forward; and
    a second driving assembly, the second driving assembly comprising:
        a second transmission rod extending along the direction perpendicular to the rotary axis, the second transmission rod and the first transmission rod positioned at two sides of the main gear;
a fourth bevel gear coupled to the second transmission rod, and engaged with the main gear;
a fifth bevel gear coupled to the second transmission rod and spaced apart from the fourth bevel gear;
a second rotating rod positioned below the second transmission rod, extending along the direction parallel to the rotary axis,
a sixth bevel gear engaged with the fifth bevel gear,
a direction-changing gear coupled to the second rotating rod, and
a second driving wheel coupled to the direction-changing gear and abutted against a second side surface of the wheel of the bicycle opposite to the first side surface for assisting the wheel of the bicycle to move forward.

14. The bicycle of claim 13, wherein the direction-changing gear comprises a first engaging portion, a second engaging portion and a coupling rod, the first engaging portion couples to the second rotating rod and spaced apart from the sixth bevel gear, the second engaging portion engages the first engaging portion, the coupling rod is inserted into the second engaging portion and extends along the direction parallel to the rotary axis, the second driving wheel couples to the coupling rod, wherein the second driving wheel is spaced apart from the second engaging portion to drive the wheel of the bicycle to move forward.

15. The bicycle of claim 13, wherein the second driving wheel is a rubber wheel.

16. The bicycle of claim 13, wherein the first driving wheel is a rubber wheel.

17. The bicycle of claim 13, wherein the driver comprises a driving body and a driving shaft rotatably coupled to the driving body, the main gear is coupled to the driving shaft, the rotary axis extends along a lengthwise direction of the driving shaft, and wherein the driving body is capable of driving the main gear to rotate about the rotary axis.

* * * * *